United States Patent [19]

Reymore, Jr. et al.

[11] 3,836,424

[45] Sept. 17, 1974

[54] POLYISOCYANURATE FOAM ARTICLES

[76] Inventors: Harold E. Reymore, Jr., 18 Cardinal Dr., Wallingford, Conn. 06492;
Adnan A. R. Sayigh, 999 Hartford Tpk., North Haven, Conn. 06473;
Robin L. Grieve, Trasraamsteen, 14, Netherlands

[22] Filed: July 18, 1972

[21] Appl. No.: 272,784

[52] U.S. Cl................ 161/159, 161/160, 161/161, 161/190, 260/2.5 AW, 260/2.5 AZ
[51] Int. Cl............................ B32b 5/18, B32b 3/26
[58] Field of Search .......... 161/159, 190, 160, 161; 260/2.5 AW, 2.5 AZ

[56]  References Cited
UNITED STATES PATENTS

| | | | |
|---|---|---|---|
| 3,635,848 | 2/1972 | Rambosek | 260/2.5 AW |
| 3,644,168 | 2/1972 | Bonk | 161/160 |
| 3,736,298 | 5/1973 | Schmit | 161/190 |

FOREIGN PATENTS OR APPLICATIONS

| | | | |
|---|---|---|---|
| 1,104,394 | 2/1968 | Great Britain | 260/2.5 AW |

*Primary Examiner*—George F. Lesmes
*Assistant Examiner*—Ellis P. Robinson
*Attorney, Agent, or Firm*—James S. Rose

[57]  ABSTRACT

Novel integral-skinned polyisocyanurate foams are described, which are characterized by their improved impact resistance. The foams are prepared by conventional integral-skin foam forming techniques. The improved structural properties are obtained by employing as a polyol component of the foam forming mixture, a mixture of (a) from about 5 percent to about 60 percent by weight of a polyol having a functionality of from 2 to 8 and an equivalent weight of from 30 to 200, with (b) from about 40 percent to about 95 percent by weight of a polyether polyol having a functionality of from 2 to 3 and an equivalent weight of from about 750 to about 2100; provided that when said polyether polyol is a triol having an equivalent weight of from about 1500 to about 2100, at least about 50 percent of the hydroxyl groups thereof are primary hydroxyls. The improved foams of the invention are particularly useful as structural materials, where high impact resistance is required.

15 Claims, No Drawings

POLYISOCYANURATE FOAM ARTICLES

BACKGROUND OF THE INVENTION

1. Field of the Invention

This invention relates to novel polymeric materials and is more particularly concerned with rigid polymeric materials having a cellular core and an integrally formed outer non-cellular surface layer, the polymeric material being of uniform chemical composition in which the major recurring unit is an isocyanurate moiety.

2. Description of the Prior Art

Self-skinned rigid polyisocyanurate foam articles have been described previously; see, for example, U.S. Pat. No. 3,644,168. As disclosed by that reference, self-skinned polyisocyanurate foams have excellent physical properties which make them useful construction materials in a wide range of applications. For example, their high tensile, compressive and screw holding strengths make them useful structural members, replacing wood and metals in automotive, furniture, building, marine, household appliance and like constructions. Self-skinned rigid polyisocyanurate foams are also characterized by their high degree of thermal stability in comparison, for example, to polyurethane foams. This property has made the self-skinned polyisocyanurates particularly valuable in applications where there is a likelihood of exposure to flame or unusual heat conditions.

The novel foams of our invention possess substantially all of the properties which have made the prior known self-skinned polyisocyanurates of value. For example, thermal stability of the skin-layer is comparable to the stability observed in skins of prior known self-skinned polyisocyanurate foams. This is particularly important since the skin layers generally deteriorate at lower temperatures than the foam core, and so govern the usefulness of self-skinned foams in high temperature environments. In addition, the foam materials of this invention exhibit markedly improved impact resistance in comparison to previously known self-skinned rigid polyisocyanurate foams. This finding is particularly surprising in that the improved foams are obtained, in part, by incorporating substantial proportions of high molecular weight polyether polyols into the foam forming reaction mixture. Closely related experimentation has previously shown that such a step adversely affects thermal stability of the polymer article obtained.

SUMMARY OF THE INVENTION

The invention comprises an improved rigid polymer article having a continuous integrally formed microcellular polymeric outer layer and an inner cellular polymeric core, and in which the major recurring polymer unit is an isocyanurate moiety, said article being prepared by bringing together in a closed mold under integral skin-forming conditions, (A) an aromatic polyisocyanate, (B) a catalyst for trimerizing said polyisocyanate, (C) a polyol, and (D) a polyhalogenated blowing agent; wherein the improvement comprises employing as the polyol (C) from about 0.1 to about 0.5 equivalents, per equivalent of polyisocyanate, of a mixture comprising (i) from about 5 percent to about 60 percent by weight of a polyol having a functionality of from 2 to 8, inclusive, and an equivalent weight of from about 30 to about 200; and (ii) from about 40 percent to about 95 percent by weight of a polyether polyol selected from (a) polyether diols having an equivalent weight of from about 750 to about 2100, (b) polyether triols having an equivalent weight of from about 750 to about 1500 and (c) polyether triols having an equivalent weight of from about 1500 to about 2100 at least about 50 percent of the hydroxyl groups of which triols are primary hydroxyl groups.

The terms "continuous integrally formed microcellular polymeric outer layer", "integrally-skinned", and "self-skinned" are used herein to describe the outer layer or "skin" of the foam articles of the invention. This skin is a highly characteristic and distinguishing feature of self-skinned polyisocyanurate foams. In general, the terms as used herein refer to an outer polymeric layer which is integral with an inner cellular core of identical polymeric composition. The outer layer and the inner core are formed in one step, essentially simultaneously, from the same reaction mixture. However, the physical properties of skin and core differ markedly. The skin is a solid polymeric material, having minute cells encapsulated therein which form no part of a regular cellular matrix as is shown in ordinary polymer foams. The density of the skin is generally uniform ranging from about 55 to 70 pounds per cubic foot. The cellular core of self-skinned polyisocyanurate foams generally has a uniform cellular structure with a density ranging from about 5 pounds per cubic foot to about 50 pounds per cubic foot. The boundary between skin and core is clearly delineated by an abrupt change in density.

Generally, the skin or outer layer in self-skinned polyisocyanurate foams is of a uniform thickness throughout the article. This thickness ranges from between about 0.25 millimeters to about 3.0 millimeters.

The foam materials of this invention are particularly characterized by their markedly improved impact resistance. By this is meant that the skin layer will resist fracture under more severe impact forces, than will skin layers of previously known self-skinning polyisocyanurate foams. The foams of the invention are particularly useful as structural materials where there is a likelihood of exposure to impact with solid objects. For example, as components of automobiles and aircraft, the novel foams of the invention can be molded into impact resistant body panels, roofs, fenders, floor pans, air scoops, grille components, structural members of seats, luggage racks, heater housings and the like. Computer housings, instrument panel assemblies, and the like are also useful articles prepared from the foams of the invention. An extensive list of other applications for which the foams of this invention are useful can be found in U.S. Pat. No. 3,644,168.

DETAILED DESCRIPTION OF THE INVENTION

The improved foam articles of the invention are obtained by an improvement in the known process for preparing rigid integral-skinned polyisocyanurate foam materials.

In general, the known methods of preparing integral-skinned polyisocyanurate foams comprises bringing together under particular foaming conditions and in a closed mold, an organic polyisocyanate, a catalyst for trimerizing said polyisocyanate and a polyhalogenated hydrocarbon blowing agent. The preparation of rigid integrally-skinned polyisocyanurate foams is fully detailed in U.S. Pat. No. 3,644,168 and the disclosures of that reference are hereby incorporated herein by reference. By referring to this patent, and in particular that portion beginning at Col. 6, line 16 through Col. 20, line 75, one is immediately apprised of extensive lists of reactants, catalysts, blowing agents, necessary foaming conditions, optional foam components, preferred molds, preferred reaction temperatures, reactant proportions and like information for preparing the previously known integral-skinned polyisocyanurates. All of this information is applicable to the preparation of the improved foams of this invention the only change being in the nature of the polyol component employed.

As an optional component of self-skinned polyisocyanurate foam forming reaction mixtures, U.S. Pat. No. 3,644,168 teaches the addition of up to about 0.3 equivalent of a polyol for each equivalent of polyisocyanate present. The polyol additives are described in the reference patent at Col. 12, line 8 through Col. 13, line 24 as any one of those having an average hydroxyl equivalent weight of from about 30 to about 1500 and a functionality of from 2 to 8; i.e., having 2 to 8 hydroxyl groups per molecule.

The improved self-skinned foams of this invention are obtained by employing as the polyol component in the above-described known procedures a particular mixture of polyols in an amount from about 0.1 equivalent to about 0.5 equivalent per equivalent of polyisocyanate. Preferably the polyol mixture is employed in an amount from about 0.2 equivalent to about 0.4 equivalent, and most preferably from about 0.3 to about 0.4 equivalent, per equivalent of polyisocyanate. The integral-skin polyisocyanurate foams obtained by the improved process of the invention possess skin layers having markedly improved impact resistance while retaining resistance to deterioration at high temperatures.

The polyol mixture employed is a mixture of (a) from about 5 percent to about 60 percent (preferably from about 35 percent to about 50 percent) by weight of a polyol having a functionality of from 2 to 8, i.e: containing from 2 to 8 hydroxyl groups per molecule, and an equivalent weight of from about 30 to about 200; and (b) from about 40 percent to about 95 percent (preferably from about 50 percent to about 65 percent) by weight of a polyether polyol having a functionality of 2 to 3 and an equivalent weight of from about 750 to about 2100 provided that when said polyether polyols are triols having equivalent weights of between 1500 and about 2100, at least 50 percent of the hydroxyl groups of said triols are primary hydroxyls.

Most preferably, the above described mixture of polyols contains approximately equal proportions, by weight, of the two classes of polyol specified.

Both classes of polyol employed in the above described mixture are well known. The class of polyol characterized in part as having an equivalent weight of from 30 to 200 is illustrated by any of the polyols of appropriate equivalent weight which were described as optional polyol additives in U.S. Pat. No. 3,644,168 (Col. 12, line 18 through Col. 13, line 37).

Preferred as the lower equivalent weight class of polyol of type (a) above are polyol mixtures having an average functionality of from 4 to 6 and an average equivalent weight of from about 85 to about 200, comprising from about 50 percent to about 95 percent by weight of (A) a polyol adduct produced by mixing under hydroxyalkylation conditions from 2 to 5 moles of an alkylene oxide such as ethylene oxide, propylene oxide, or 1,2-butylene oxide, or mixtures thereof, and one amine equivalent of a polyamine mixture, 100 parts of said polyamine mixture containing from 45 to 70 parts of methylenedianilines, the remaining parts being triamines and polyamines of higher molecular weight, said polyamine mixture having been formed by acid condensation of aniline and formaldehyde; in admixture with (B) from about 5 percent to about 50 percent by weight of an aliphatic triol-alkylene oxide adduct having an equivalent weight of from about 75 to about 200; such polyol blends are well known, see for example, the polyol mixtures disclosed in the U.S. Pat. No. 3,423,344.

Illustrative of polyols of type (b) above employed in the polyol mixtures used to prepare the foams of the invention are:

i. polyether diols having an equivalent weight from about 750 to about 2100 such as the polyether glycols prepared by reacting ethylene oxide, propylene oxide, butylene oxide or mixtures thereof with diols such as ethylene glycol, 1,2-propylene glycol, 1,3-propanediol, 1,4-butanediol, 2,3-butanediol, 1,5-pentanediol, 1,2-hexanediol, diethanolamine, diisopropanolamine, resorcinol, catechol, bis(p-hydroxyphenyl)methane, diethylene glycol, dipropylene glycol, and the like;

ii. polyether triols having a molecular weight from about 750 to about 2100 such as the polyether triols prepared by reacting ethylene oxide, propylene oxide, butylene oxide or mixtures thereof with triols such as glycerol, trimethylolmethane, trimethylolethane, trimethylolpropane, 1,2,3-hexanetriol, 1,2,6-hexanetriol, 1,1,1-trimethylolhexane, triethanolamine, tripropanolamine, triisopropanolamine and the like. Preferred as polyether triols are the polyoxyalkylene triols prepared by reacting ethylene oxide, propylene oxide, and mixtures thereof with aliphatic triols such as glycerol and trimethylolpropane. Particularly preferred polyether trols are the polyoxyalkylene triols having equivalent weights of from about 1000 to about 1500.

Particularly preferred as the second class of polyol (b) are the polyoxyalkylene glycols such as the polyoxyethylene glycols prepared by the addition of ethylene oxide to water, ethylene glycol or diethylene glycol; polyoxypropylene glycols prepared by the addition of 1,2-propylene oxide to water, propylene glycol or dipropylene glycol; mixed oxyethyleneoxypropylene polyglycols prepared in a similar manner utilizing a mixture of ethylene oxide and 1,2-propylene oxide. Preferred polyoxyalkylene glycols are those having an equivalent weight of between about 1000 and 1600. The polyoxyalkylene glycols having an equivalent weight of about 1500 are the most preferred polyether polyols for preparing the improved foam articles of this invention.

Although any organic polyisocyanate can be used to prepare integral-skinned polyisocyanurate foams, the preferred polyisocyanates employed in preparing the novel foam articles of this invention are aromatic polyisocyanates. Examples of such polyisocyanates are toluene-2,4-diisocyanate, toluene-2-6-diisocyanate, 4,4'-methylenebis(phenyl isocyanate), 2,4'-methylenebis(phenyl isocyanate), 2,2'-methylenebis(phenyl isocyanate) and mixtures thereof;

modified forms of methylenebis(phenyl isocyanates), particularly methylenebis(phenyl isocyanates), which have been treated to render them stable liquids at ambient temperatures such as those described in U.S. Pat. Nos. 3,384,653, 3,394,164 and 3,394,165.

Particularly preferred polyisocyanates for preparing the foams of this invention are the polymeric isocyanates such as mixtures of polymethylene polyphenyl isocyanates containing from about 35 percent to about 85 percent by weight of methylenebis(phenyl isocyanates) the remainder of said mixture being polymethylene polyphenyl isocyanates of functionality higher than 2.0. The latter mixtures are described in, for example, U.S. Pat. Nos. 2,683,730, 2,950,263 and 3,012,008, and are obtained by phosgenation of the corresponding mixtures of methylene bridged polyphenyl polyamines which, in turn, are obtained by the acid condensation of aniline with formaldehyde. The mixtures of polymethylene polyphenyl isocyanates which can be employed to prepare the rigid self-skinned foams of improved properties include those mixtures which have been heat treated to render the viscosity more suitable for machine handling. Such treatments are carried out at temperatures from about 150°C to about 300°C under such conditions that the viscosity (at 25°C) is increased to about 800 to 1500 centipoises.

The following examples describe the manner and process of making and using the invention and set forth the best mode contemplated by the inventors of carrying out the invention, but are not to be construed as limiting. Unless otherwise stated, all proportions given are parts by weight. The various data relating to physical properties was derived as follows unless otherwise indicated.

Thermal gravimetric analysis: the test was carried out using a representative weighed sample (about 6 to 25 milligrams). The analytical apparatus employed is a DuPont 900 thermal analyzer in consort with the DuPont 950 thermal gravimetric analysis plug in module (E. I. DuPont Instruments Corp.). The test sample was heated at a rate of 20°C per minute in air.

Deflection under load: ASTM Test Method D-648
Density: ASTM Test Method D-1622
Flexural strength: ASTM Test Method D-790
Flexural modulus: ASTM Test Method D-790

Impact resistance: the test is carried out on a Gardner light-duty variable impact tester, model IG-115 (Gardner Laboratory, Inc., 5521 Landy Lane, Bethseda, Maryland), according to the following procedure: Fifteen to twenty-five representative samples of each foam tested, measuring 2" long × ½" wide and 1" thick, including a skin surface on top and bottom, are subjected to impact by dropping a two pound round nose steel rod upon one skin surface, from varying heights. Development of a stress crack in the surface or skin layer is registered as a failure. The numerical value in foot-pounds, assigned as the impact resistance of a given foam, represents the mean break or failure height and is calculated by the Bruceton Staircase statistical technique [see Report No. 101.1 R, SRG-P, No. 40 of the Applied Mathematics Panel of the National Defense Research Committee (July 1944); O. R. Weaver, Materials Research and Standards, Vol. 6, No. 6, pps. 285–292 (June 1966)].

EXAMPLE 1

An integral-skinned, rigid, polyisocyanurate foam is prepared using the following foam ingredients and proportions:

| Component A | Parts | |
|---|---|---|
| Polyol[1] | 38 | (0.3 equivalents) |
| Thanol TE-3000[2] | 40 | (0.04 equivalents) |
| Catalyst[3] | 3 | |
| Isotron F-11-B[4] | 25 | |
| Verona Black | 4 | |
| Component B | | |
| PAPI-135[5] | 133.5 | (1 equivalent) |

Footnotes:
[1] A polyol of equivalent weight = 133 and average functionality of 5.25 which is a blend of (i) an adduct of propylene oxide and a methylene bridged polyphenyl polyamine mixture obtained by acid condensation of aniline and formaldehyde and (ii) a glycerol-propylene oxide adduct; prepared according to the method of example 68 in U.S. Pat. No. 3,423,344.
[2] A polyether triol adduct of propylene oxide and trimethylolpropane, capped with ethylene oxide, equivalent weight of about 1000, Jefferson Chemical Co., Houston, Texas; see Bulletin of March 2, 1964.
[3] N,N',N''-Tris(dimethylaminopropyl)sym-hexahydrotriazine.
[4] Stabilized trichlorofluoromethane, Pennsalt Chemical Corporation, Philadelphia, PA.
[5] Polymethylene polyphenyl polyisocyanate, equivalent weight of 135, containing approximately 50 percent by weight of methylene bis(phenyl isocyanate), The Upjohn Company, Kalamazoo, Michigan, see Bulletin No. CD-1041 of June 1971.

The ingredients of Component A are blended in a pail, and thereafter admixed with Component B using a high speed (drill press) mixer. An aluminum mold (8" × 8" × 1") is preheated circa 125°F and charged with about 475 gms. of the foam mixture. The mold is closed, and foaming occurs within about one minute. The foam is demolded about 15 minutes after filling, and is cured at room temperature (circa 25°C) for about 7 days. The foam has excellent skin surface, free from bubbles and flaws, with fine uniform cells in the core. The foam so prepared is identified as "Foam A", for which mechanical and thermal properties are shown in Table I below.

For comparison purposes, a second foam, identified herein as "Foam B" is prepared following the above procedure except that the Thanol TE-3000 is omitted and the proportion of polyol[1] is increased by 40 parts to give a total of 78 parts polyol[1]. The proportion of catalyst is reduced to 2 parts in preparing Foam B to compensate for the higher reactivity of the polyol[1] over Thanol TE-3000. The physical properties of the resulting Foam B are also shown in Table I below.

TABLE I

| | FOAM | |
|---|---|---|
| | A | B |
| Density, pcf. | | |
| Overall | 30.8 | 25.6 |
| Core | 22.3 | 20.2 |
| Skin | 71.0 | 69.2 |
| Skin Thickness, inches | 0.06 | 0.05 |
| Impact Resistance, foot lbs. | 2.5 | 0.4 |
| Deflection Under Load (264 psi), °C | | |
| Start | 32 | 43 |
| 0.005 | 50 | 55 |
| 0.010 | 56 | 60 |
| DSC Tg, °C | 93 | 96 |
| Flexural Strength, psi | 2200 | 1200 |
| Flexural Modulus, psi | 124,000 | 118,000 |

It will be seen from the above results that Foam A has markedly improved impact resistance and flexural strength when compared with Foam B.

EXAMPLE 2

A series of integrally-skinned rigid polyisocyanurate foams is prepared using the following foam ingredients and proportions.

| | FOAM | | | | |
|---|---|---|---|---|---|
| | C | D | E | F | G |
| Component A | | | parts | | |
| Polyol[1] | 38 | 38 | 38 | 38 | 38 |
| Voranol CP-3001[2] | — | 20 | 40 | 60 | 80 |
| Catalyst[3] | 2.5 | 2.5 | 2.5 | 2.6 | 2.7 |
| DC-193, surfactant[4] | 1 | 1 | 1 | 1 | 1 |
| Isotron F-11-B[5] | 25 | 25 | 25 | 25 | 25 |
| Component B | | | | | |
| PAPI-135[6] | 134 | 134 | 134 | 134 | 134 |

Footnotes:
[1]"Polyol[1]" as employed in Example 1, supra.
[2]A polyether triol adduct of propylene oxide and glycerol, equivalent weight of approximately 1000, hydroxyl No. 54.3 – 62.3, Dow Chemical Co., Midland, Michigan, see Vorane Bulletins VF-4 and V-4 of September 1960.
[3]N,N',N''-Tris(dimethylaminopropyl) sym-hexahydrotriazine.
[4]An organosilicone surfactant, Dow Chemical Co., supra.; see Bulletin No. 05-146 of August 1968.
[5]See Example 1
[6]See Example 1

The ingredients of Component A are blended together in a pail and thereafter admixed with Component B using a high speed (drill press) mixer. An aluminum mold (8" × 8" × 1") is preheated to a temperature of circa 120°F and then charged with about 500 gms. of the foam forming mixture. The mold is then closed and foaming is completed in about one minute. The foam is demolded about 15 minutes after filling and the foam cured at a temperature of about 150°–160°F for 16 hours. The foam is found to have excellent skin surface, free from bubbles and flaws, with fine uniform cells in the core.

The foams produced as described above were found to have the following physical properties.

| | FOAM | | | | |
|---|---|---|---|---|---|
| | C | D | E | F | G |
| Density, lbs/cu.ft. | | | | | |
| Overall | 27.4 | 29.1 | 28.3 | 29.6 | 30.1 |
| Core | 19.0 | 18.8 | 17.8 | 21.1 | 18.7 |
| Impact Resistance, Ft. lbs. | 0.3 | 0.5 | 1.2 | 1.2 | 1.4 |

It will be seen from the above results that the introduction of the polyether triol has produced marked improvement in the impact resistance of Foams E, F, and G as compared with Foams C and D.

EXAMPLE 3

A series of self-skinned polyisocyanurate foams are prepared by repeating the procedure of Example 2, except that the polyether triol component (Voranol CP-3001) is replaced with polyether triols of various equivalent weights and primary hydroxyl contents. The proportion of triol employed is constant throughout the series, at 40 parts by weight. It is necessary to adjust the proportion of catalyst used, to compensate for the variable reactivity of the triols. The triols used, and the proportion of catalyst employed, are as follows:

Foams H, I and L are not foams of the invention since the polyether triols fall outside the range called for herein, but demonstrate by comparison the improvement found in the foams of the invention. Foam N is a control, prepared in the same manner as Foams H through M, but without the polyether triol additive. The physical properties found upon testing the foams are as follows:

| | FOAM | | | | | | |
|---|---|---|---|---|---|---|---|
| | H | I | J | K | L | M | N |
| Polyether Triol | (1) | (2) | (3) | (4) | (5) | (6) | — |
| Equivalent weight | 93 | 341 | 1000 | 1000 | 1920 | 2100 | — |
| % Primary Hydroxyls | 100 | 0 | 0 | 50 | 0 | 50 | — |
| Catalyst Proportion Employed | 2.0 | 2.0 | 2.5 | 2.5 | 2.7 | 2.5 | 2.5 |

Footnotes:
(1)Isonol 93, an ethylene oxide adduct of bimethylolpropane, approximate equivalent weight 93. The Upjohn Co., supra; see Bulletin of February 6, 1968.
(2)Niax LG-168, a propylene oxide adduct of glycerine, approximate equivalent weight of 341. Union Carbide Corp., N.Y., N.Y.; see Bulletin F-40613, 1961.
(3)Niax LG-56, a propylene oxide adduct of glycerine, approximate equivalent weight of 1000. Union Carbide Corp., supra.
(4)Voranol CP-3001, Dow Chemical Corp., supra.
(5)Niax LHT-28, a propylene oxide adduct of glycerine, approximate equivalent weight of 1920. Union Carbide Corp., supra.
(6)Thanol SF-6500, ethylene oxide capped triol adduct of propylene oxide and glycerol, Jefferson Chem., supra.

| | FOAM | | | | | |
|---|---|---|---|---|---|---|
| | H* | I | J | K | L | M | N** |
| Density, lbs./cu.ft. | | | | | | | |
| Overall | 28.3 | 30.1 | 31.5 | 30.4 | 30.9 | 31.3 | 26.5 |
| Core | — | 23.2 | 22.1 | 21.2 | 28.2 | 23.3 | 19.1 |
| Skin Thickness, Inches | — | 0.05 | 0.06 | 0.06 | 0.04 | 0.06 | 0.08 |
| Impact Resistance, ft. lbs. | — | *** | 1.6 | 1.0 | 0.2 | 1.1 | 0.4 |
| Deflection under load (264 PSI), °C | | | | | | | |
| Start | — | 48 | 43 | 40 | 35 | 53 | — |
| 0.005 | — | 56 | 59 | 59 | 49 | 67 | — |
| 0.010 | — | 62 | 60 | 71 | 60 | 75 | — |
| DSC Tg., °C | — | 99 | 94 | 95 | 94 | 92 | — |

Footnotes:
*Foam is brittle, split on demolding. No tests possible.
**Foam shows internal splitting. Samples of sufficient size for complete testing not available.
***Split at <0.2

| FOAM | | | | | | | |
|---|---|---|---|---|---|---|---|
| | H | I | J | K | L | M | N |
| Thermal gravimetric analysis, skin; % weight loss at: | | | | | | | |
| 200°C | | | | 3 | | 2 | 3 |
| 300°C | | | | 15 | | 14 | 18 |
| 400°C | | | | 34 | | 34 | 38 |
| 500°C | | | | 60 | | 63 | 58 |
| 600°C | | | | 83 | | 84 | 80 |
| 40% weight loss at, °C | | | | 425 | | 430 | 420 |
| 50% weight loss at, °C | | | | 450 | | 440 | 475 |
| Core; % weight loss at: | | | | | | | |
| 200°C | | | | 6 | | 2 | 4 |
| 300°C | | | | 19 | | 7 | 15 |
| 400°C | | | | 36 | | 25 | 29 |
| 500°C | | | | 50 | | 46 | 45 |
| 600°C | | | | 76 | | 77 | 80 |
| 50% weight loss at, °C | | | | 500 | | 525 | 525 |

This example illustrates the improved impact resistance, without significant loss of thermal stability, obtained in the improved foams J, K, and M of the invention as compared with Foam N which contains no polyether triol, and Foams H, I and L which contain polyether triols outside the range called for herein.

EXAMPLE 4

A series of self-skinned polyisocyanurate foams are prepared by repeating the procedure of Example 2, except that the polyether triol component (Voranol CP-3001) is replaced by a variety of polyether diols of various equivalent weights. The proportion of diol is maintained at 40 parts by weight throughout the series. It is necessary to compensate for the differing reactivities of the diols by adjusting the proportions of catalyst used. The diols used and the proportion of catalyst employed are as follows:

| FOAM | | | | | | |
|---|---|---|---|---|---|---|
| | O | P | Q | R | S | T |
| Polyether Diol | (1) | (2) | (3) | (4) | (5) | — |
| Equivalent wt. | 510 | 997 | 1000 | 1470 | 1550 | — |
| Catalyst Proportion (parts by wt.) | 2.3 | 2.5 | 2.0 | 2.5 | 2.5 | 2.5 |

Footnotes:
(1) Polypropylene glycol 1025, Union Carbide Corp., supra.
(2) Pluronic L-61, Wyandotte Chemicals, Wyandotte, Michigan. The pluronic series of polyols by Wyandotte are reported to be difunctional polyoxyalkylene block copolymers with terminal hydroxyl groups. Polyols within the series reportedly differ in molecular weight and in percent of primary hydroxyls.
(3) Pluronic L-44, Wyandotte, supra.
(4) Pluronic L-81, Wyandotte, supra.
(5) Niax PPG-3025, a polypropylene glycol of average M.W. 3000, Union Carbide Corp., supra.

The physical properties found upon testing the foam products are as follows. Foam O uses a diol outside the range called for herein and is not a foam of the invention, but illustrates by comparison, the improvement found in foams of the invention. Foam T is a control, prepared in the same manner as Foams O through S, but without the polyether diol additive.

| FOAM | | | | | | |
|---|---|---|---|---|---|---|
| | O* | P | Q | R | S | T** |
| Density, pcf | | | | | | |
| Overall | — | 31.1 | 30.9 | 31.4 | 32.6 | 26.5 |
| Core | — | 22.6 | 18.9 | 19.8 | 22.4 | 19.1 |
| Skin Thickness, inches | — | 0.045 | 0.06 | 0.05 | 0.07 | 0.08 |
| Impact Resistance, ft. lbs. | — | 1.2 | 1.0 | 1.5 | 1.3 | 0.4 |
| Flexural strength, psi | — | 1920 | 2010 | 2260 | 1760 | — |
| Deflelction under load, (264 psi, °C) | | | | | | |
| Start | — | 35 | 29 | 37 | 39 | — |
| 0.005 | — | 54 | 58 | 58 | 63 | — |
| 0.010 | — | 64 | 64 | 68 | 70 | — |
| DSC Tg., °C | — | 99 | 101 | 100 | 98 | — |

| FOAM | | | | | |
|---|---|---|---|---|---|
| | O* | P | Q R | S | T |
| Thermal gravimetric analysis, skin; % weight loss at: | | | | | |
| 200°C | | 2 | | 2 | 3 |
| 300°C | | 16 | | 16 | 18 |
| 400°C | | 36 | | 36 | 38 |
| 500°C | | 65 | | 60 | 58 |
| 600°C | | 82 | | 81 | 80 |
| 40% weight loss at, °C | | 415 | | 420 | 420 |
| 50% weight loss at, °C | | 445 | | 450 | 475 |
| Core, % weight loss at: | | | | | |
| 200°C | | 5 | | 3 | 4 |
| 300°C | | 12 | | 12 | 15 |
| 400°C | | 30 | | 29 | 29 |
| 500°C | | 42 | | 47 | 45 |
| 600°C | | 80 | | 80 | 80 |
| 50% weight loss at, °C | | 545 | | 520 | 525 |

Footnotes:
* Skin blistered; no test possible.
** Foam shows internal splits. Samples of sufficient size for complete testing not available.

This example illustrates the improved impact resistance, without significant loss of thermal stability, obtained in the improved foams of the invention.

We claim:

1. An improved rigid polymer article having a continuous integrally formed microcellular polymeric outer layer having a density from about 55 to about 70 pounds per cubic foot and an inner cellular polymeric core having a density from about 5 to about 50 pounds per cubic foot, and in which the major recurring polymer unit in said layer and said core is an isocyanurate moiety, said article being prepared by bringing together in a closed mold under integral skinforming conditions,
   A. an aromatic polyisocyanate;
   B. a catalyst for trimerizing said polyisocyanate;
   C. a polyol; and
   D. a polyhalogenated blowing agent; wherein the improvement comprises employing as the polyol (C), from about 0.1 to about 0.5 equivalents per equivalent of polyisocyanate, of a mixture comprising
      i. from about 5 to about 60 percent by weight of a polyol which is a blend of a. a polyol adduct produced by mixing under hydroxyalkylation conditions from 2 to 5 moles of an alkylene oxide with one amine equivalent of a polyamine mixture, said polyamine mixture containing from 45 to 70 percent by weight of methylenedianilines, the balance being triamines and polyamines of higher molecular weight, said polyamine mixture being formed by acid condensation of aniline and formaldehyde; with b. an aliphatic triol-alkylene oxide adduct polyol having an equivalent weight of from about 75 to about 200; said blend having an average functionality of between 4 to 6, inclusive, and an equivalent weight of from about 85 to about 200; and ii. from about 40 percent to about 95 percent by weight of a polyoxyalkylene polyol selected from polyoxyalkylene diols having an equivalent weight of from about 750 to about 2100, polyoxyalkylene triols having an equivalent weight of from about 750 to about 1500 and polyoxyalkylene triols having an equivalent weight of from about 1500 to about 2100, at least about 50 percent of the hydroxyl groups present therein being primary hydroxyl groups.

2. A polymer article according to claim 1 wherein said polyisocyanate is a polymethylene polyphenyl polyisocyanate containing from about 35 percent to about 85 percent by weight of methylenebis(phenylisocyanates).

3. A polymer article according to claim 1 wherein the proportion of polyol (C) employed is from about 0.2 to about 0.4 equivalents per equivalent of polyisocyanate.

4. A polymer article according to claim 1 wherein the polyol (C) is a mixture of from about 35 percent to about 50 percent by weight of the polyol (i) with from about 50 percent to about 65 percent by weight of the polyol (ii).

5. A polymer article according to claim 1 wherein said polyoxyalkylene polyol (ii) is a polyether diol having an equivalent weight of from about 750 to about 2100.

6. A polymer article according to claim 1 wherein said polyoxyalkylene polyol (ii) is a polyether triol having an equivalent weight of from about 750 to about 1500.

7. A polymer article according to claim 1 wherein said polyoxyalkylene polyol (ii) is a polyether triol having an equivalent weight of from about 1500 to about 2100 wherein at least 50 percent of the hydroxyl groups therein are primary hydroxyl groups.

8. An improved rigid polymer article having a continuous integrally-formed microcellular polymeric outer layer having a density from about 55 to about 70 pounds per cubic foot and an inner cellular polymeric core having a density from about 5 to about 50 pounds per cubic foot, and in which the major recurring polymer unit in said layer and said core is an isocyanurate moiety, said article being prepared by bringing together in a closed mold under integral skin-forming conditions A. a polymethylene polyphenyl polyisocyanate containing from about 35 percent to about 85 percent by weight of methylenebis(phenylisocyanates);
B. a catalyst for trimerizing said polyisocyanate;
C. a polyol; and
D. a polyhalogenated blowing agent; wherein the improvement comprises employing as the polyol (C), from about 0.2 to about 0.4 equivalents per equivalent of polyisocyanate, of a mixture comprising i. from about 35 percent to about 50 percent by weight of a blend of a. a polyol adduct produced by mixing under hydroxyalkylation conditions from 2 to 5 moles of an alkylene oxide with 1 amine equivalent of a polyamine mixture containing from 45 to 70 percent by weight of methylenedianilines, the balance being triamines and polyamines of higher molecular weight, said polyamine mixture being formed by acid condensation of aniline and formaldehyde; with b. an aliphatic triol-alkylene oxide adduct polyol having an equivalent weight of from about 75 to about 200;

said blend having an average functionality of between 4 to 6, inclusive, and an average equivalent weight of from about 85 to about 200; and ii. from about 50 percent to about 65 percent by weight of a polyoxyalkylene polyol selected from polyoxyalkylene diols having an equivalent weight of from about 750 to about 2100, polyoxyalkylene triols having an equivalent weight of from about 750 to 1500 and polyoxyalkylene triols having an equivalent weight of from about 1500 to about 2100 and having at least about 50 percent of the hydroxyl groups present as primary hydroxyl groups.

9. A polymer article according to claim 8 wherein said polyoxyalkylene polyol (ii) is a polyoxyalkylene diol having an equivalent weight of from about 750 to about 2100.

10. A polymer article according to claim 8 wherein said polyoxyalkylene polyol (ii) is a polyoxyalkylene triol having an equivalent weight of from about 750 to about 1500.

11. A polymer article according to claim 8 wherein said polyoxyalkylene polyol (ii) is a polyoxyalkylene triol having an equivalent weight of from about 1500 to about 2100 and having at least about 50 percent of the hydroxyl groups present as primary hydroxyl groups.

12. An improved rigid polymer article having a continuous integrally formed microcellular polymeric outer layer having a density from about 55 to about 70 pounds per cubic foot and an inner cellular polymer core having a density from about 5 to about 50 pounds per cubic foot, and in which the major recurring polymer unit in said layer and said core is an isocyanurate moiety, said article being prepared by bringing together in a closed mold under integral skin-forming conditions, A. a polymethylene polyphenyl polyisocyanate containing from about 35 percent to about 85 percent by weight of methylenebis(phenylisocyanates);
B. a catalyst for trimerizing said polyisocyanate;
C. a polyol; and
D. a polyhalogenated blowing agent;

wherein the improvement comprises employing as the polyol (C), from about 0.3 equivalents to about 0.4 equivalents per equivalent of polyisocyanate of a mixture comprising i. from about 35 percent to about 50 percent by weight of a. a polyol adduct produced by mixing under hydroxyalkylation conditions from 2 to 5 moles of propylene oxide with 1 amine equivalent of a polyamine mixture containing from 45 to 70 percent by weight of methylenedianilines, the balance being triamines and polyamines of higher molecular weight, said polyamine mixture being formed by acid condensation of aniline and formaldehyde; with b. a glycerol-propylene oxide adduct polyol having an equivalent weight of from about 75 to about 200;

said blend having an average functionality of between 4 to 6, inclusive, and an average equivalent weight of from about 85 to about 200; and ii. from about 50 percent to about 65 percent by weight of a polyoxyalkylene polyol selected from polyoxyalkylene diols having an equivalent weight of from about 1000 to about 1600, polyoxyalkylene triols having an equivalent weight of from about 1000 to about 1500 and polyoxyalkylene triols having an equivalent weight of from about 1500 to about 2100 in which at least about 50 percent of the hydroxyl groups present are primary hydroxyl groups.

13. A polymer article according to claim 12 wherein said polyoxyalkylene polyol (ii) is a polyoxyalkylene diol having an equivalent weight of from about 1000 to about 1600.

14. A polymer article according to claim 12 wherein said polyoxyalkylene polyol (ii) is a polyoxyalkylene triol having an equivalent weight of from about 1000 to about 1500.

15. A polymer article according to claim 12 wherein said polyoxyalkylene polyol (ii) is a polyoxyalkylene triol having an equivalent weight of from about 1500 to about 2100 in which at least about 50 percent of the hydroxyl groups present are primary hydroxyl groups.

* * * * *